Aug. 17, 1965   E. V. BARR   3,200,426
FLUID DRIVEN AND CONTROLLED TAPPING UNIT
Filed March 28, 1962   5 Sheets-Sheet 4
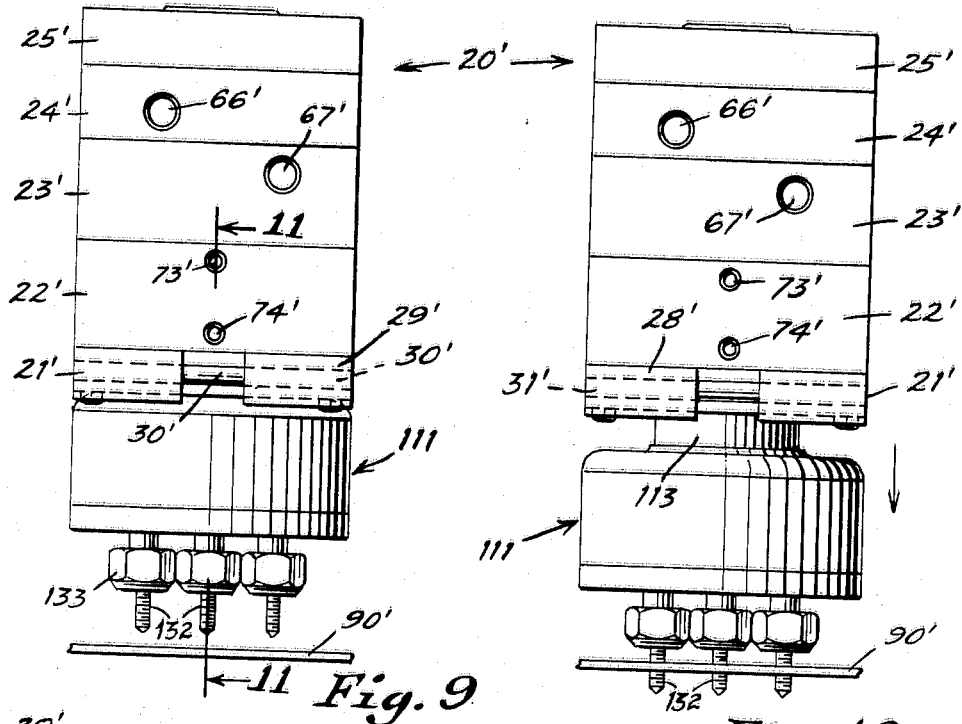
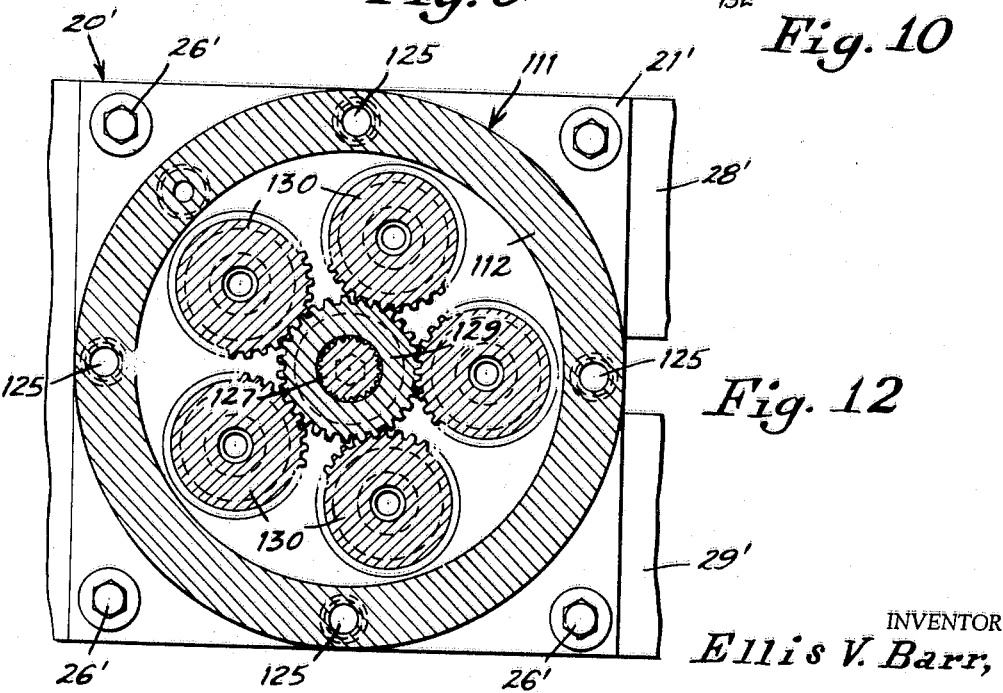
INVENTOR
*Ellis V. Barr,*
BY
ATTORNEY

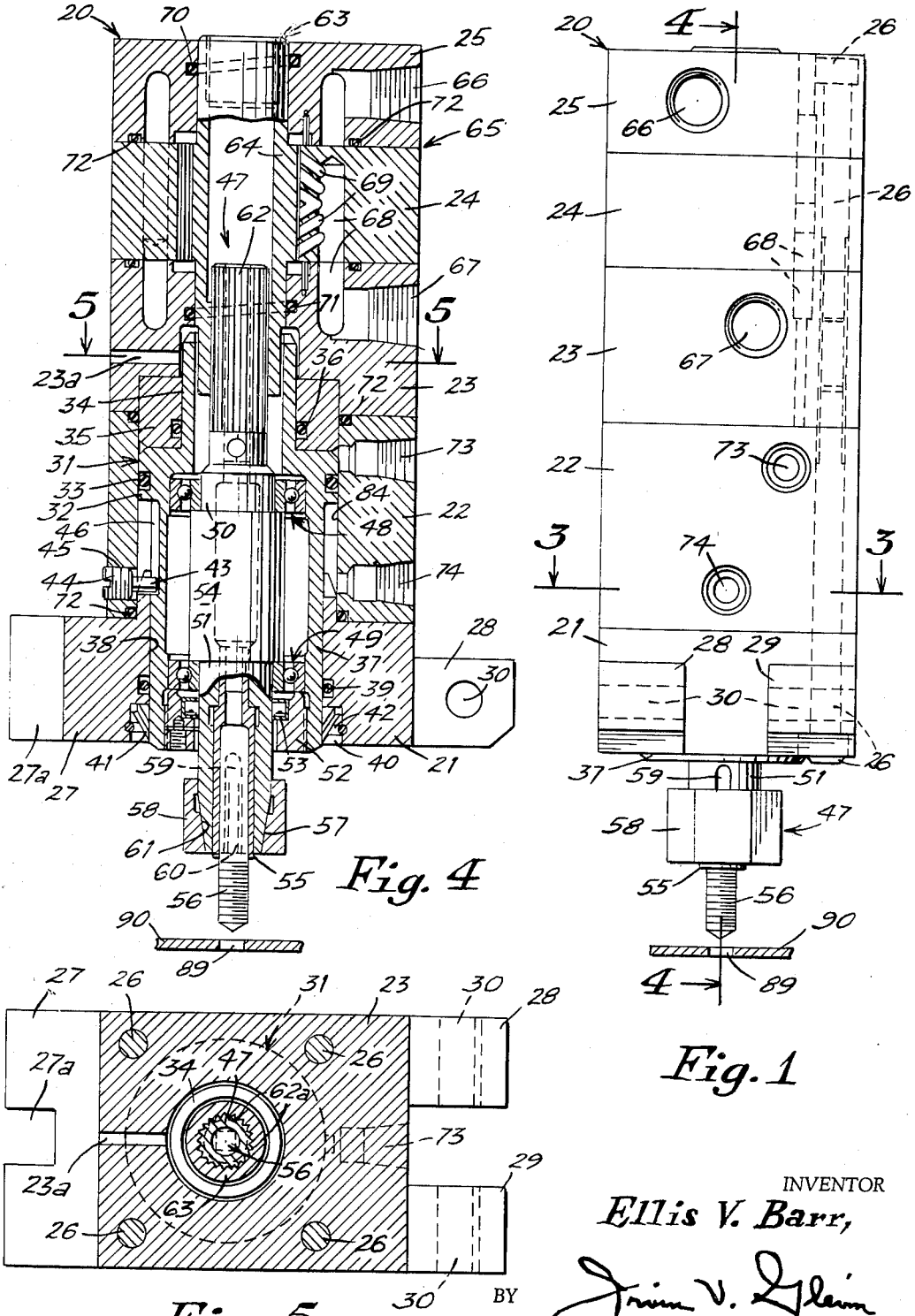

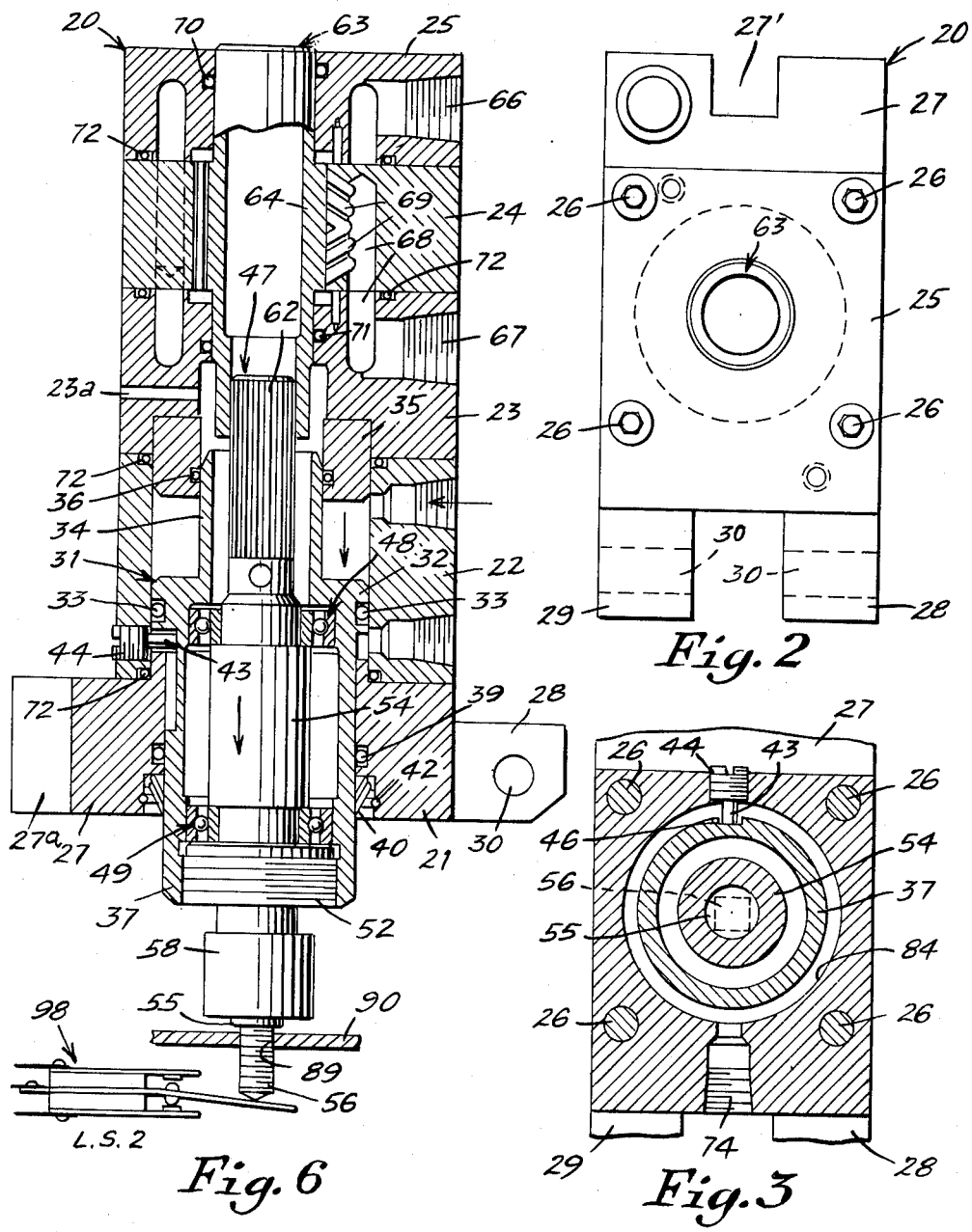

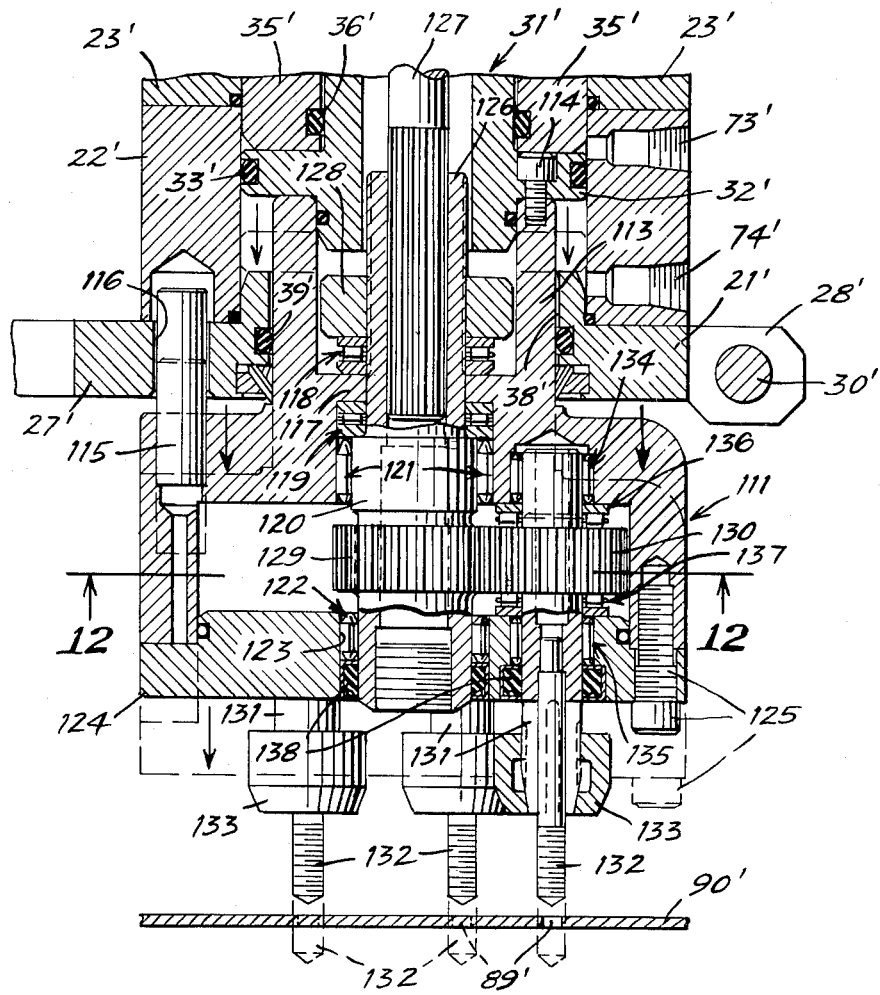

United States Patent Office
3,200,426
Patented Aug. 17, 1965

1

3,200,426
FLUID DRIVEN AND CONTROLLED
TAPPING UNIT
Ellis V. Barr, Dayton, Ohio, assignor to Laughter Corp.,
Dayton, Ohio, a corporation of Ohio
Filed Mar. 28, 1962, Ser. No. 183,255
7 Claims. (Cl. 10—136)

This application is a continuous-in-part of application S.N. 48,266 filed August 8, 1960 for "Tapping Unit With Means To Advance Spindle To Work," now Patent No. 3,158,883 issued December 1, 1964.

This invention relates to a tapping unit and, more particularly, to a fluid driven and controlled tapping unit.

Generally, there is provided a vertically elongated casing adapted for being fixedly mounted on an automatic tapping machine in which work pieces having apertures formed therein are advanced serially beneath the tapping unit and firmly held in alignment with the tapping unit during each automatic tapping operation. A spindle carrying a tap axially disposed at its lower end, is reciprocally mounted within the housing on a pneumatically operated piston, the down and up movements of which are automatically controlled by a limit switch engageable by the lower end of the tap at the end of each tapping operation. The upper end of the spindle is splined for vertical movement within the rotor sleeve of a hydraulically driven motor fixed to or mounted within the upper end of the housing and also automatically reversible for withdrawal of the tap from the work piece to complete the two-stroke tapping operation.

It is, accordingly, an object of the present invention to provide a compact tapping unit having a built-in small and highly efficient reversible hydraulic motor for driving the unit.

It is another object of the invention to provide a tapping unit in which the down and up movements of its tap-carrying spindle are controlled by a double acting pneumatic piston in which the spindle is axially and rotatably mounted.

It is a further object of the invention to provide a device of the character described having simple, electrically and pneumatically operated valve systems for effecting the motor and piston reversals.

It is still another object of the invention to provide a unit of the type disclosed having a multiple tap head driven by a simple, compact planetary gear system.

Other and further objects of the invention will become apparent from a reading of the following specification, taken in conjunction with the drawings, in which:

FIGURE 1 is an elevational view of a preferred embodiment of the invention;

FIGURE 2 is a plan view of the tapping unit of FIGURE 2;

FIGURE 3 is a plan view in section taken on line 3—3 of FIGURE 1;

FIGURE 4 is an elevational view in axial section taken on line 4—4 of FIGURE 1;

FIGURE 5 is a plan view in section taken on line 5—5 of FIGURE 4;

FIGURE 6 is an elevational view in medial section similar to FIGURE 4 but showing the movable parts in their extremely downwardly extended position;

FIGURE 9 is an elevational view of a modified form of the invention;

FIGURE 10 is a view similar to FIGURE 9 but showing the multiple tap head in its extreme downwardly extended position;

FIGURE 11 is an enlarged fragmentary elevational view in section taken on line 11—11 of FIGURE 9; and FIGURE 12 is a plan view from below in section taken on line 12—12 of FIGURE 11.

Figure 8:
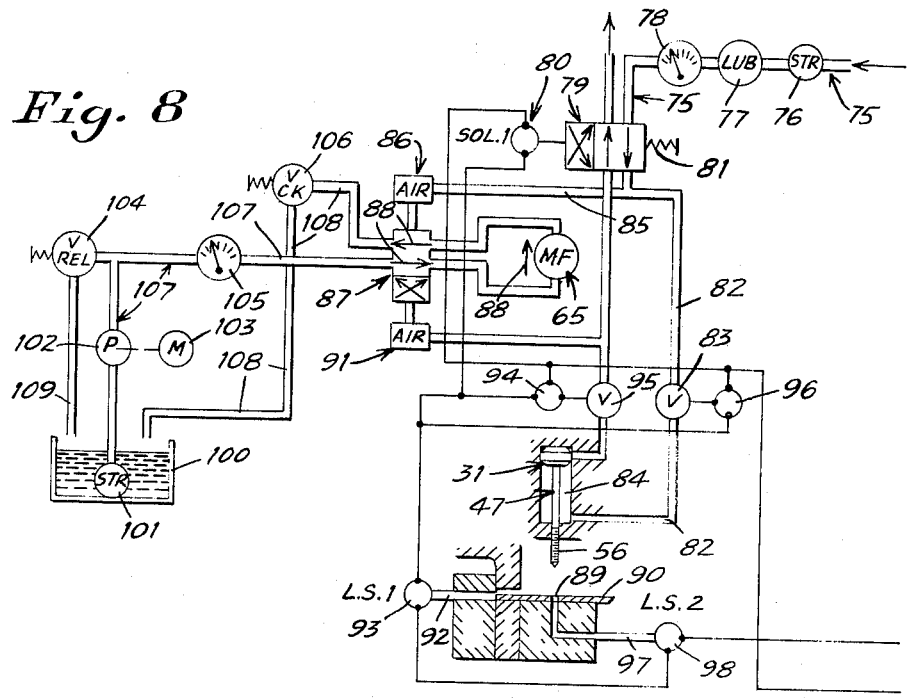
FIGURE 8 is a schematic view illustrating the hydraulic, penumatic and part of the electrical power and control systems.

With reference now to FIGURES 1 through 6 of the drawings, the numeral 20 generally designates the tapping unit of this invention. Unit 20 comprises a body or housing conveniently formed of five superposed rectangular blocks 21 through 25 formed of steel or other suitable alloy castings and held accurately in vertical stacked alignment by four threaded tie rods 26 passing vertically through close fitting aligned bores in the corner areas of blocks 21–25.

Lowermost or mounting block 21 has a rectangular extension 27 at one end thereof projecting beyond the adjacent vertical face of unit 20. Extension 27 has a vertical rectangular guide way 27a machined therein for cooperating with a vertically disposed rectangular guide rail (not shown) which thereby guides tapping unit 20 during relative adjusting or other movement thereof relative to the machine of which it is a part. A pair of lugs 28 and 29 extend horizontally from the other end of the base block 21 and are provided with horizontally aligned bores 30 to receive a pivot pin passing through said bores and through another aligned bore in a mounting block (not shown) fitted into the space between lugs 28 and 29.

Vertical blocks 21, 22 and 23 are provided with vertical axis concentric cylindrical vertical bores of various diameters to constitute a cylinder in which a sleeve-type piston 31 is pneumatically reciprocated to effect the lowering and raising of the tap. The largest diameter portion 32 of piston 31 is circumferentially grooved to receive a sealing O-ring 33. An upper reduced diameter portion 34 of piston sleeve 31 is slidably guided in an annular block 35, the inner cylindrical surface of which is provided with an annular channel to receive a sealing O-ring 36. An intermediate diameter portion 37 of piston sleeve 31 is guided in a close fitting bore 38 in lowermost block 21, said bore having an annular channel machined therein to receive a sealing O-ring 39. A countersunk annular channel 40 holds additional packing material 41 which is held therein by a split retaining ring 42. Piston 31 is held against rotation and is limited in its up and down strokes by a pin 43 having an enlarged threaded coaxial head 44. Head 44 is received in a radial threaded bore 45 in block 22 for removable positioning of pin 43 in a vertical groove 46 cut into the outer surface of the reduced diameter piston portion 37 for thus limting vertical movements as well as preventing rotation of piston 31.

A tapping spindle generally designated 47 is coaxially rotatably mounted in piston sleeve 31 by a pair of ball bearings 48 and 49, the inner races of which embrace intermediate diameter portions 50 and 51 of spindle 47. Lower ball bearing 49 is held in the position thereof shown in FIGURE 4 by a retention sleeve 52 which includes a conventional grease seal 53. Bearings 48 and 49 seat against the ends of the largest diameter portion 54 of spindle 47 and thus serve also as thrust bearings for the spindle 47.

The lower end of spindle 47 is provided with a stepped axial bore to snugly receive therein a similarly stepped adaptor sleeve 55, the axial bore of which slidably receives the shank of a tap 56. The lower end of piston portion 51 is conically tapered at 57 to receive thereover a similarly tapered constriction sleeve 58. The lower ends of spindle 47 and of adaptor sleeve 55 are both provided with two or more vertically extending slits 59 and 60, respectively, whereby the same are constrictively movable by tapered surfaces 57 and 61 for tightly gripping the shank of tap 56.

An enlarged central portion 64 of sleeve 63 constitutes the rotor of a hydraulic motor, generally designated 65, built into the three blocks 23, 24 and 25. The hydraulic motor 65 is conventional. Accordingly, the motor per se will not be described herein, but only those details thereof necessary for an understanding of its mode of operation relative to the tapping unit 20 will be given. Such details include two intake and outlet ports 66 and 67 in blocks 25 and 23, respectively, and a distribution chamber 68 coupled to the port 67 and a similar distribution chamber (not shown) connected at a point circumferentially spaced from distribution chamber 68 to the port 66. The motor chamber is provided with a plurality of small ports 69 for feeding the hydraulic fluid from the distribution chambers into the cylinder in which rotor 64 is reversibly driven by the hydraulic fluid, the direction of rotation being controlled by reversing the flow of fluid between ports 66 and 67.

The coaxial bores in blocks 25 and 23 in which the reduced diameter portions of sleeve 63 rotate are provided with tilted annular channels to receive sealing O-rings 70 and 71. The abutting flat faces of blocks 21-25 are provided with annular channels to receive therein additional O-rings, collectively designated 72, to prevent loss of hydraulic fluid or air at the joints formed by said abutting faces.

Piston 31 is moved vertically within the body or housing 20 and relatively to the sleeve 63 of fluid motor 65 by compressed air or the like introduced into the piston chamber alternately through air ports 73 and 74 for lowering or raising piston 31, respectively, by pressure exerted against the upper or lower surfaces of the enlarged portion 32 of piston sleeve 31, as will hereinafter be more fully described in the description of the control system.

The pneumatic and hydraulic systems are schematically illustrated in FIGURE 8. Compressed air from a conventional source (not shown) is conducted by a conduit generally designated 75 through a strainer or filter 76, a lubricator 77 and a pressure gauge 78 to a conventional reversing valve 79, which valve is normally held in the control position of FIGURE 8 until operated to a flow reversing position by a solenoid 80 controlled by an electrical system hereinafter described. In the FIGURE 8 position of valve 79 (the position shown being maintained by compression spring 81), compressed air is directed through conduit 82 controlled by valve 83 to the lower portion of a cylinder 84 to raise piston 31 to its upper position shown, thus holding tap 56 and its driving spindle 47 in their retracted positions.

In the position of air valve 79, shown in FIGURE 8, compressed air is likewise conducted by conduit 85 to an air cylinder generally designated 86 for moving and holding a reversing hydraulic valve, generally designated 87 and being of known construction, to and in the position shown for directing hydraulic fluid in the direction of arrows 88. Hydraulic fluid thus directed drives the motor 65 in the required direction for withdrawing tap 56 from a tapped aperture 89 in a work piece 90, FIGURES 4 and 6. This reversed or tap withdrawing direction of rotation of motor 65 continues until the reversing hydraulic valve 87 is moved by an oppositely acting pneumatic cylinder generally designated 91 by an electrical control system next to be described.

When the work piece 90 is positioned with its untapped aperture 89 in alignment with tap 56, as shown in FIGURE 8, the left edge of work piece 90 engages an operator rod 92 of a limit switch 93 which completes an electric circuit through a solenoid 94 to open a pneumatic valve 95 and to a solenoid 96 to open valve 83. Simultaneously, switch 93 energizes solenoid 80 to move the reversing pneumatic valve 79 to the right, FIGURE 8, against the action of compression spring 81 to direct compressed air into the upper end of cylinder 84. This forces spindle 47 downwardly to bring tap 56 into tapping engagement in aperture 89 of work piece 90. Valve 79, in its position effected by such energization of solenoid 80, now directs compressed air to pneumatic cylinder 91 to operate hydraulic reversing valve 87 to produce a flow of hydraulic fluid in a direction the reverse of that shown by arrows 88 to reverse the fluid motor 65 and rotate it in the direction required for tapping aperture 89.

When the tapping operation is completed, the lower end of tap 56 engages an operator 97 of a second limit switch 98 to interrupt the circuit through solenoid 80, thus permitting compression spring 81 to return pneumatic reversing valve 79 to its tap withdrawing and hydraulic motor reversing position shown in FIGURE 8.

Figure 7:
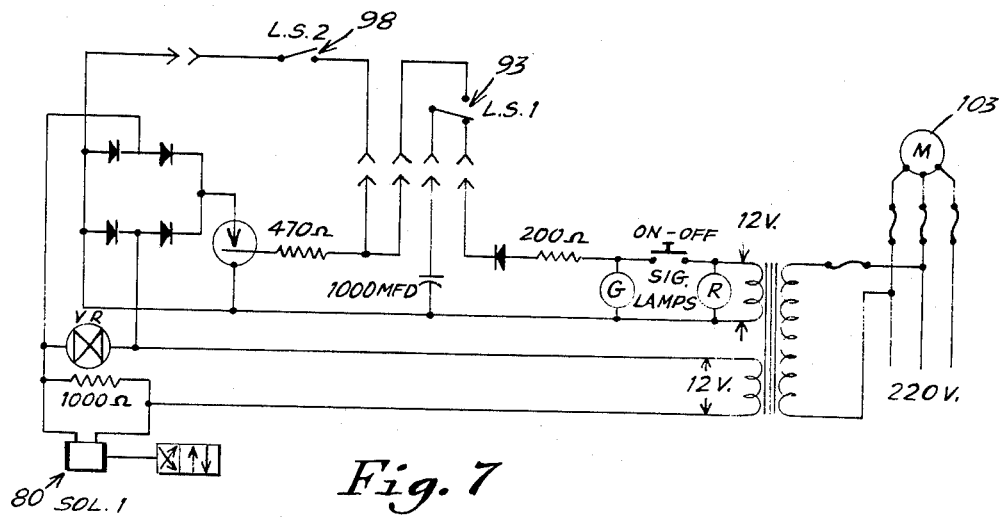
FIGURE 7 is a wiring diagram of the electrical circuit.

The wiring diagram of FIGURE 7 is illustrative of one of any circuits which could be employed to effect the automotive control of the system of FIGURE 8 as described above, and being self-explanatory, need not be described at length herein.

Hydraulic system of FIGURE 8 comprises, in addition to the parts heretofore described, a reservoir 100 for the oil or other hydraulic fluid used, a conventional strainer 101, a pump 102, an electric motor 103, a relief valve 104, a pressure gauge 105, a check valve 106, a supply conduit generally designated 107 and two return conduits 108 and 109.

In the multiple tap species of the invention illustrated in FIGURES 9 through 12 of the drawings, identical or functionally equivalent parts are designated by primed numerals, which numerals unprimed were used to designate their counterparts in the species of FIGURES 1 through 8. The principal differences reside in the provision of a head 111 comprising an inverted cup-shaped shell 112 having an upwardly extending reduced diameter cylindrical portion 113 fixed by screws 114 to the lower end 32' of a piston 31'.

The cylindrical extension 113 of the head 111 is vertically slidably guided within a bore 38' of a lowermost body block 31'. Head 111 is held against rotation about the vertical axis of the unit by a pin 115 fixed in a vertical axis bore in the head 111 and extending upwardly into an aligned bore 116 in the lowermost body block 27'.

Cylindrical extension 113 of head 111 has an inwardly directed centrally apertured flange 117, the upper and lower surfaces of which serve as seats, respectively, for tapered roller thrust bearings 118 and 119. A tubular shaft 120 is axially supported in the aperture of flange 117 by roller bearings 121 and 122, the latter bearing lying between the lower portion of the tubular shaft 120 and a concentric vertical bore 123 in a lower closure plate 124 for housing 111. Closure plate 124 is removably fastened to the downturned rim of head 111 by a series of screws 125. The upper end 126 of the tubular shaft has the inner surface of its concentric bore vertically splined for relative vertical but non-rotating coupling thereof to a splined drive shaft 127 of a hydraulic motor, not shown, similar to motor 65 of the first-described species. A collar 128 surrounds and is fixed to the tubular extension 126 of cylindrical shaft 120 and serves as an upper seat bearing against the upper thrust bearing 118.

Tubular shaft 120 has formed thereon or fixed thereto a sun gear 129 which cooperates with a plurality of planetary gears 130 spaced therearound as desired and each, in turn, driving a vertical axis shaft 131 each having a tap 132 held in a concentric axial bore in the lower end of said shaft. The lower end of each shaft 131 is vertically slit and has a conical taper for cooperation with a conically tapered chuck sleeve 133 which constricts the slit end of shaft 131 into gripping and holding relation with the shank of tap 132.

Each shaft 131 is provided with upper and lower roller bearings 134 and 135 and with upper and lower thrust bearings 136 and 137, respectively. The lower sets of bearings are mounted in vertical bores in closure plate 124 or, in the case of thrust bearings 137, abut against the top surface of closure plate 124. The vertical bores in closure plate 124, through which the several shafts 120 and 131 pass loosely to provide bearing spaces between the bores and the shafts, have the lower portions of said spaces closed by bearing seals collectively designated 138.

While but two forms of the invention have been shown and described herein, it will be readily apparent to those skilled in the are that many minor modifications may be made without departing from the spirit of the invention or the scope of the appended claims.

What is claimed is:

1. A tapping unit comprising a body, a double acting piston and cylinder assemblage carried by said body, a spindle journaled for rotation in said piston and axially reciprocatable therewith and thereby from a retracted to an extended position, means for detachably coupling at least one tap to one end of said spindle, a fluid motor having a rotor drivingly coupled to the other end of said spindle, said body comprising a plurality of block-like portions in superposed rigid assembly with certain of said portions having bores formed therein defining said cylinder and the motor chamber for said rotor, means for reversibly supplying a first fluid to said motor for selectively driving said rotor in a threading direction or in a reverse direction of said spindle, means including first conduit means connected to opposite ends of said cylinder for alternately supplying a second fluid thereto to reciprocate said piston, and means including second conduit means establishing fluid connection between said first conduit means and said reversible supply means to reverse the direction of rotation of said rotor when said piston reciprocates.

2. Structure in accordance with claim 1 wherein said rotor drives the spindle in a threading direction during movement thereof approaching said extended position and drives in a reverse direction when said spindle moves toward said retracted position.

3. Structure in accordance with claim 1 wherein said alternate supply means includes valve means operable in response to the position of a workpiece to be tapped for initiating movement of said spindle toward said extended position.

4. Structure in accordance with claim 3 wherein said valve means is electrically actuated and automatically operable to reciprocate said spindle after a predetermined movement thereof.

5. A tapping unit comprising a body, a double acting piston and cylinder assemblage carried by said body, means for alternately directing fluid under pressure to opposite ends of the cylinder part of said assemblage to reciprocate the piston part thereof, a spindle journaled for rotation in said piston and axially reciprocatable therewith and thereby, means for detachably coupling at least one tap to one end of said spindle, a fluid motor having a rotor drivingly coupled to the other end of said spindle, means including a reversing valve for alternately circulating pressurized fluid in opposite directions through said motor for driving said tap first to tappingly penetrate a workpiece bore to be threaded and then to withdraw therefrom by a thread-smoothing reverse rotation, said body comprising a plurality of block-like portions in superposed rigid assembly, certain of said block-like portions having bores formed therein defining said cylinder, the motor chamber for said rotor and seats for bearings for said spindle.

6. A tapping unit comprising a body, a double acting piston and cylinder assemblage carried by said body, means for alternately directing fluid under pressure to opposite ends of the cylinder part of said assemblage to reciprocate the piston part thereof, a spindle journaled for rotation in said piston and axially reciprocatable therewith and thereby, means for detachably coupling at least one tap to one end of said spindle, a fluid motor having a rotor having a splined connection to the other end of said spindle, means including a reversing valve for alternately circulating pressurized fluid in opposite directions through said motor for driving said tap first to tappingly penetrate a workpiece bore to be threaded and then to withdraw therefrom by a thread-smoothing reverse rotation, said body comprising a plurality of block-like portions in superposed rigid assembly, certain of said block-like portions having bores formed therein defining said cylinder, the motor chamber for said rotor and seats for bearings for said spindle.

7. A tapping unit comprising a body, a double acting piston and cylinder assemblage carried by said body, means for alternately directing fluid under pressure to opposite ends of the cylinder part of said assemblage to reciprocate the piston part thereof, a spindle journaled for rotation in said piston and axially reciprocatable therewith and thereby, means for detachably coupling at least one tap to one end of said spindle, a fluid motor having a rotor drivingly coupled to the other end of said spindle, means including a reversing valve for alternately circulating pressurized fluid in opposite directions through said motor for driving said tap first to tappingly penetrate a work piece bore to be threaded and then to withdraw therefrom by a thread-smoothing reverse rotation, said body comprising a plurality of block-like portions in superposed rigid assembly, certain of said block-like portions having bores formed therein defining said cylinder, the motor chamber for said rotor and seats for bearings for said spindle, said means for detachably coupling said at least one tap to said spindle comprising a head fixed in said piston, a plurality of parallel circumferentially spaced spindles mounted in said head for simultaneous axial movement thereby and therewith, power-transmission means coupling said spindle to said parallel spindles, said power transmission means being a sun gear fixed to said spindle and cooperating planetary gears fixed to said parallel spindles, and an upwardly extending vertical pin eccentrically affixed in said head, said body having a bore in the lower end portion thereof for slidably receiving said pin whereby to prevent rotational movement of said head with reference to said body.

References Cited by the Examiner

UNITED STATES PATENTS

| | | | |
|---|---|---|---|
| 1,385,438 | 7/21 | Errington | 10—130 |
| 2,310,124 | 2/43 | Shartle | 10—136.5 |
| 2,459,902 | 1/49 | Tucker | 77—33.5 |
| 2,509,696 | 5/50 | Pegard | 10—130 |
| 2,525,626 | 10/50 | Stauffer et al. | 218—47 |
| 2,724,134 | 11/55 | Perlotte | 10—129 |
| 2,896,587 | 7/59 | Hause | 10—139 |
| 2,930,261 | 3/60 | Emrick | 77—33.5 |
| 3,015,117 | 1/62 | Braendel et al. | 10—139 |
| 3,123,847 | 3/64 | Willis et al. | 10—139 |
| 3,137,016 | 6/64 | Berlant | 10—136 |

ANDREW R. JUHASZ, *Primary Examiner.*